United States Patent
Frye et al.

(10) Patent No.: US 7,767,008 B2
(45) Date of Patent: *Aug. 3, 2010

(54) VAPOR/LIQUID SEPARATION APPARATUS (75) Inventors: James M. Frye, Houston, TX (US); David Beattie, Singapore (SG); Richard C. Stell, Houston, TX (US); Subramanian Annamalai, Houston, TX (US); Alok Srivastava, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/335,333

(22) Filed: Dec. 15, 2008

(65) Prior Publication Data

US 2009/0107887 A1 Apr. 30, 2009

Related U.S. Application Data (62) Division of application No. 11/009,661, filed on Dec. 10, 2004, now Pat. No. 7,481,871.

(51) Int. Cl.
*B01D 19/00* (2006.01)

(52) U.S. Cl. .............................. 96/193; 96/197; 96/202; 96/209; 95/246; 95/271; 55/459.1; 202/158

(58) Field of Classification Search ................ 55/459.1, 55/463; 95/159, 160, 162, 172, 245, 246, 95/247, 263, 266, 271; 96/193, 194, 197, 96/202, 209, 262
See application file for complete search history.

(56) References Cited

U.S. PATENT DOCUMENTS

| | | | |
|---|---|---|---|
| 2,411,809 A | 11/1946 | Rupp et al. | |
| 3,410,759 A | 11/1968 | Fontenot et al. | |
| 3,487,006 A * | 12/1969 | Gambro et al. | ............... 208/93 |
| 3,492,795 A | 2/1970 | Guerrieri | |
| 3,721,720 A * | 3/1973 | Chapman et al. | ............ 585/723 |
| 3,793,394 A * | 2/1974 | Chapman | .................... 585/723 |
| 3,871,969 A | 3/1975 | Chapman | |
| 3,900,300 A * | 8/1975 | Lehman | ....................... 96/181 |
| 4,187,088 A | 2/1980 | Hodgson | |
| 4,199,409 A | 4/1980 | Skraba | |
| 4,568,452 A | 2/1986 | Richmond | |
| 4,663,026 A | 5/1987 | Louie et al. | |
| 4,664,784 A | 5/1987 | Harandi | |
| 4,714,542 A | 12/1987 | Lockett, Jr. | |
| 5,296,104 A | 3/1994 | Signorini et al. | |
| 5,527,980 A | 6/1996 | Carlson | |
| 5,547,909 A | 8/1996 | Carlson | |
| 5,767,335 A | 6/1998 | Anderson et al. | |

(Continued)

*Primary Examiner*—Duane Smith
*Assistant Examiner*—Robert A Clemente (57) ABSTRACT

A vapor/liquid separation apparatus for treating a flow of vapor/liquid mixtures of hydrocarbons and steam comprises a vertical drum with a side inlet to introduce hydrocarbon/steam mixtures, an overhead vapor outlet, and a lower section in communication with a cylindrical boot of less diameter than the drum, the boot comprising sufficient gas-liquid contact surface, e.g., that provided by one or more sheds, baffles and/or distillation trays, to provide at least a partial theoretical distillation stage, and a lower portion for receiving liquid from the drum, a lower outlet for removing the liquid, and an inlet for introducing a stripping gas such as steam, hydrogen, light crackable hydrocarbon, and/or methane, below the distillation tray and preferably above the level of liquid in the boot.

13 Claims, 3 Drawing Sheets

U.S. PATENT DOCUMENTS

| | | |
|---|---|---|
| 5,853,568 A | 12/1998 | Brander |
| 6,376,732 B1 * | 4/2002 | Ngan et al. ................ 585/800 |
| 7,045,669 B2 | 5/2006 | Sumner et al. |
| 7,311,746 B2 | 12/2007 | Stell et al. |
| 7,481,871 B2 * | 1/2009 | Frye et al. ................ 96/193 |
| 2004/0004028 A1 * | 1/2004 | Stell et al. ................ 208/130 |

* cited by examiner

VAPOR/LIQUID SEPARATION APPARATUS

CROSS-REFERENCE TO RELATED APPLICATIONS

This application is a divisional of U.S. patent application Ser. No. 11/009,661 filed Dec. 10, 2004 now U.S. Pat. No. 7,481,871, and is fully incorporated herein by reference.

FIELD

The present invention relates to a vapor/liquid separation apparatus which exhibits great efficiency in removing non-volatile hydrocarbons from hydrocarbon feedstocks.

BACKGROUND

Steam cracking, also referred to as pyrolysis, has long been used to crack various hydrocarbon feedstocks into olefins, preferably light olefins such as ethylene, propylene, and butenes. Conventional steam cracking utilizes a pyrolysis furnace which has two main sections: a convection section and a radiant section. The hydrocarbon feedstock typically enters the convection section of the furnace as a liquid (except for light feedstocks which enter as a vapor) wherein it is typically heated and vaporized by indirect contact with hot flue gas from the radiant section and by direct contact with steam. The vaporized feedstock and steam mixture is then introduced into the radiant section where the cracking takes place. The resulting products, including olefins, leave the pyrolysis furnace for further downstream processing, including quenching.

Conventional steam cracking systems have been effective for cracking high-quality feedstocks such as gas oil and naphtha. However, steam cracking economics sometimes favor cracking low cost heavy feedstock such as, by way of non-limiting examples, crude oil and atmospheric resid, also known as atmospheric pipestill bottoms. Crude oil and atmospheric resid contain high molecular weight, non-volatile components with boiling points in excess of 590° C. (1100° F.). The non-volatile, heavy ends of these feedstocks would lay down as coke in the convection section of conventional pyrolysis furnaces as the lighter components were vaporized. Only very low levels of non-volatiles can be tolerated in the convection section downstream of the point where the lighter components have fully vaporized.

Additionally, during transport some naphthas are contaminated with heavy crude oil containing non-volatile components. Conventional pyrolysis furnaces do not have the flexibility to process residues, crudes, or many residue or crude contaminated gas oils or naphthas which are contaminated with non-volatile components.

To address coking problems, U.S. Pat. No. 3,617,493, which is incorporated herein by reference, discloses the use of an external vaporization drum for the crude oil feed and discloses the use of a first flash to remove naphtha as vapor and a second flash to remove vapors with a boiling point between 230 and 590° C. (450 and 1100° F.). The vapors are cracked in the pyrolysis furnace into olefins, and the separated liquids from the two flash tanks are removed, stripped with steam, and used as fuel.

U.S. Pat. No. 3,718,709, which is incorporated herein by reference, discloses a process to minimize coke deposition. It describes preheating of heavy feedstock inside or outside a pyrolysis furnace to vaporize about 50% of the heavy feedstock with superheated steam and the removal of the residual, separated liquid. The vaporized hydrocarbons, which contain mostly light volatile hydrocarbons, are subjected to cracking.

U.S. Pat. No. 5,190,634, which is incorporated herein by reference, discloses a process for inhibiting coke formation in a furnace by preheating the feedstock in the presence of a small, critical amount of hydrogen in the convection section. The presence of hydrogen in the convection section inhibits the polymerization reaction of the hydrocarbons thereby inhibiting coke formation.

U.S. Pat. No. 5,580,443, which is incorporated herein by reference, discloses a process wherein the feedstock is first preheated and then withdrawn from a preheater in the convection section of the pyrolysis furnace. This preheated feedstock is then mixed with a predetermined amount of steam (the dilution steam) and is then introduced into a gas-liquid separator to separate and remove a required proportion of the non-volatiles as liquid from the separator. The separated vapor from the gas-liquid separator is returned to the pyrolysis furnace for heating and cracking.

U.S. application Ser. No. 10/188,461 filed Jul. 3, 2002, Patent Application Publication US 2004/0004022 A1, published Jan. 8, 2004, which is incorporated herein by reference, describes an advantageously controlled process to optimize the cracking of volatile hydrocarbons contained in the heavy hydrocarbon feedstocks and to reduce and avoid coking problems. It provides a method to maintain a relatively constant ratio of vapor to liquid leaving the flash vessel by maintaining a relatively constant temperature of the stream entering the flash vessel. More specifically, the constant temperature of the flash stream is maintained by automatically adjusting the amount of a fluid stream mixed with the heavy hydrocarbon feedstock prior to the flash vessel. The fluid can be water.

Provisional U.S. Patent Application Ser. No. 60/555,282, filed Mar. 22, 2004, which is incorporated herein by reference, describes a process for cracking heavy hydrocarbon feedstock which mixes heavy hydrocarbon feedstock with a fluid, e.g., hydrocarbon or water, to form a mixture stream which is flashed to form a vapor phase and a liquid phase, the vapor phase being subsequently cracked to provide olefins, and the product effluent cooled in a transfer line exchanger, wherein the amount of fluid mixed with the feedstock is varied in accordance with a selected operating parameter of the process, e.g., temperature of the mixture stream before the mixture stream is flashed.

U.S. application Ser. No. 10/851,434, filed May 21, 2004, which is incorporated herein by reference, and U.S. Provisional Application Ser. No. 60/573,474, filed May 21, 2004, which is incorporated herein by reference, describe a process to increase the non-volatile removal efficiency in a flash drum used in a steam cracking system, the flash drum having a lower boot comprising an inlet for introducing stripping steam, a ring distributor for recycle quench oil, anti-swirl baffles, and a grate.

The present inventors have recognized that in using a flash/separation vessel to separate heavy non-volatile hydrocarbons from the lighter volatile hydrocarbons which can be cracked in the pyrolysis furnace, it is important to maximize the non-volatile hydrocarbon removal efficiency. Otherwise, heavy, coke-forming non-volatile hydrocarbons could be entrained in the vapor phase and carried overhead into the furnace creating coking problems in the convection section.

In simple flash operations, moderate visbreaking of hydrocarbon liquid will occur upstream of the drum and poor gas/liquid mass transfer exists in the piping upstream of the drum, resulting in production of light hydrocarbons which enter the bottom of the drum. Such drum bottoms can contain significant amounts of light hydrocarbons, which are lost as feed to the radiant section of the steam cracking furnace. Thus a significant opportunity exists to improve process economics by reducing the amount of light hydrocarbons present in the bottoms of the flash drum.

The present invention provides an apparatus and process for the effective removal of non-volatile hydrocarbon liquid from the volatile hydrocarbon vapor in the flash drum that treats the heated feed from the convection section of a steam cracking furnace. The present invention significantly enhances the separation of non-volatile and volatile hydrocarbons in the flash drum by modifying the lower boot of the flash drum to promote contact between a stripping gas and liquid entering the boot, e.g., from the upper flash drum or as recycled quenched liquid, thereby providing additional vaporization of light hydrocarbons from a given amount of feedstock.

SUMMARY

In one aspect, the present invention relates to a vapor/liquid separation apparatus comprising (a) a vertical drum having an upper cap section, a middle section comprising a circular wall, and a lower cap section; (b) an overhead vapor outlet attached to said upper cap section; (c) at least one inlet in the circular wall of said middle section; and (d) a boot of less diameter than said middle section, said boot comprising (1) an upper portion communicating with said lower cap section, (2) a middle portion comprising a gas-liquid contact surface, and (3) a lower portion for receiving liquid and holding it at a liquid level, which further comprises a lower outlet for removing said liquid and an inlet for introducing a stripping gas into said boot below said gas-liquid contact surface.

In another aspect, the present invention relates to a vapor/liquid separation apparatus for treating a flow of vapor/liquid mixtures of hydrocarbons and steam, comprising: (a) a substantially cylindrical vertical drum having an upper cap section, a middle section comprising a circular wall, and a lower cap section; (b) an overhead vapor outlet attached to the upper cap section; (c) at least one inlet in the circular wall of the middle section for introducing the flow; and (d) a substantially concentrically positioned, substantially cylindrical boot of less diameter than the middle section, the boot comprising: (1) an upper portion communicating with the lower cap section, (2) a middle portion comprising sufficient gas-liquid contact surface to provide at least a partial theoretical distillation stage, (3) a lower portion for receiving liquid and holding it at a liquid level, which further comprises a lower outlet for removing the liquid, and an inlet for introducing a stripping gas into the boot below the gas-liquid contact surface.

In another aspect, the present invention relates to an apparatus for cracking a hydrocarbon feedstock containing resid, comprising (a) a heating zone for heating the hydrocarbon feedstock to provide heated hydrocarbon feedstock; (b) a mixing zone for mixing a primary dilution steam stream with the heated hydrocarbon feedstock to provide a heated two-phase stratified open channel flow mixture stream; (c) a vapor/liquid separation zone for treating vapor/liquid mixtures of hydrocarbons and steam, the separation zone comprising (1 a substantially cylindrical vertical drum having an upper cap section, a middle section comprising a circular wall, and a lower cap section; (2) an overhead vapor outlet attached to the upper cap section; (3) at least one inlet in the circular wall of the middle section; and (4) a substantially concentrically positioned, substantially cylindrical boot of less diameter than the middle section, the boot comprising (i) an upper portion communicating with the lower cap section, (ii) a middle portion comprising sufficient gas-liquid contact surface to provide at least a partial theoretical distillation stage, and (iii) a lower portion for receiving liquid and holding it at a liquid level, which further comprises a lower outlet for removing the liquid and an inlet for introducing a stripping gas below the gas-liquid contact surface; (d) a pyrolysis furnace comprising a convection section and a radiant section for cracking the vapor phase from the overhead vapor outlet to produce an effluent comprising olefins; (e) a means for quenching the effluent; and (f) a recovery train for recovering cracked product from the quenched effluent.

In still another aspect, the present invention relates to a process for cracking a hydrocarbon feedstock containing resid. The process comprises (a) heating the hydrocarbon feedstock; (b) mixing the heated hydrocarbon feedstock with a primary dilution steam stream to form a heated two-phase stratified open channel flow mixture stream; (c) directing the mixture stream to a vapor/liquid separation apparatus for treating vapor/liquid mixtures of hydrocarbons and steam, the apparatus comprising (1) a substantially cylindrical vertical drum having an upper cap section, a middle section comprising a circular wall, and a lower cap section; (2) an overhead vapor outlet attached to the upper cap section; (3) at least one inlet in the wall of the middle section for introducing the flow; and (4) a substantially concentrically positioned, substantially cylindrical boot of less diameter than the middle section, the boot comprising (i) an upper portion communicating with the lower cap section, (ii) a middle portion comprising sufficient gas-liquid contact surface to provide at least a partial theoretical distillation stage, (iii) a lower portion for receiving liquid and holding it at a liquid level, which further comprises a liquid outlet for removing the liquid and an inlet for introducing a stripping gas below the gas-liquid contact surface; (d) removing the liquid phase through the liquid outlet of the vapor/liquid separation apparatus; (e) cracking the vapor phase in a radiant section of a pyrolysis furnace to produce an effluent comprising olefins, the pyrolysis furnace comprising a radiant section and a convection section; and (f) quenching the effluent and recovering cracked product therefrom.

DETAILED DESCRIPTION

The present invention relates to a highly efficient vapor/liquid separation apparatus for treating a flow of vapor/liquid mixtures of hydrocarbons and steam. The apparatus comprises a vertical drum or vessel having an upper cap section, a middle section comprising a circular wall, a lower cap section, a side inlet to introduce hydrocarbon/steam mixtures, an overhead vapor outlet, and a lower section in communication with a boot of less diameter than the drum, the boot comprising sufficient gas-liquid contact surface (e.g., that provided by one or more sheds, baffles, and/or distillation trays) to provide at least a partial theoretical distillation stage, a lower portion for receiving liquid from the drum, a lower outlet for removing the liquid, and an inlet for introducing a stripping gas such as steam or hydrogen below the distillation tray and, preferably, above the level of liquid in the boot. In one embodiment, this vessel is substantially cylindrical. Optimally, the boot is substantially cylindrical and positioned substantially concentrically with the vessel such that the fluid flow is unimpeded.

The present invention provides for enhanced stripping of the lower boiling hydrocarbons from the bottoms to provide additional vapor phase overhead. Such stripping is typically carried out with steam, e.g., stripping steam added at a rate ranging from about 18 to about 4000 kg/hr (40 to 8800 pounds/hr), say, a rate of about 2000 kg/hr (4400 pounds/hr). Typically, stripping steam is introduced at a rate of from about 0.01 to about 7 wt %, preferably from about 1 to about 7 wt %, say, from about 2 to about 7 wt %, of the hydrocarbon feedstock to the furnace. Such stripping can also be carried out with hydrogen, e.g., stripping hydrogen added at a rate ranging from about 2 to about 1000 kg/hr (4 to 2200 pounds/hr), such as a rate of about 500 kg/hr (1100 pounds/hr). The stripping hydrogen need not be pure; for example, it can be a hydrogen rich hydrogen/methane mixture. Typically, stripping hydrogen is introduced at a rate of from about 0.001 to about 1.5 wt %, preferably from about 0.1 to about 1.5 wt %, such as from about 0.2 to about 0.8 wt %, of the hydrocarbon feedstock. Light crackable hydrocarbons can also be utilized as stripping gas, in place of, or supplementing inert stripping gas, e.g., steam and/or hydrogen. Such light crackable hydrocarbons, which can be provided as LPG, naphtha, condensate, or other materials as known to those skilled in the art, are especially advantageous inasmuch as they provide a stripping/partial pressure effect without wasting space in the furnace taken up by inert stripping media and they crack to provide desirable prime olefins. Such light crackable hydrocarbons can be introduced as a stripping gas at a rate ranging from about 50 to about 10,000 kg/hr (110 to 22,000 pounds/hr), such as a rate of about 2500 kg/hr (5500 pounds/hr). Typically, such light crackable hydrocarbons are introduced at a rate of from about 0.04 to about 15 wt %, preferably from about 3 to about 15 wt %, such as from about 6 to about 15 wt %, of the hydrocarbon feedstock. In one embodiment, the stripping gas comprises methane, such as that obtained from pyrolysis, the use of which would improve overall selectivity for desirable olefins from the process of the present invention. Methane can be introduced as a stripping gas at a rate ranging from about 18 to about 4000 kg/hr (40 to 8800 pounds/hr), for example a rate of about 2000 kg/hr (4400 pounds/hr). Typically, methane is introduced at a rate of from about 0.01 to about 7 wt %, preferably from about 1 to about 7 wt %, such as from about 2 to about 7 wt %, of the hydrocarbon feedstock.

The gas-liquid contact surface provided in the boot can be sufficient to provide some part of a theoretical distillation stage, for example at least 10%, preferably at least 20%, such as at least 100% of a "theoretical distillation stage." A "theoretical distillation stage," also known as an "ideal equilibrium stage," "theoretical stage," "theoretical plate," or "ideal stage," is one which has the exit phases/streams in thermodynamic equilibrium, each phase/stream being removed from the stage without entraining any of the other phase/stream. This value can be measured for an individual boot using conventional techniques, including bottoms liquid sampling followed by any technique for measuring the bottoms boiling curve, e.g. the methods outlined in ASTM Standard D-2887.

In one embodiment of the present invention, the gas-liquid contacting surface(s) is provided by at least one of a shed, a baffle, and a distillation tray. For example, sheds in a row or rows can be arranged substantially perpendicular to the length of the boot. The sheds have an inverted V cross-section which serves to drain liquid formed from the surface downward off the sheds for contacting with the stripping gas or for collection as bottoms. The gas-liquid contact surface(s) can further comprise at least one additional row of sheds positioned beneath the first row of sheds and staggered so liquid flowing from the upper row of sheds drips on or near the apex of a shed in the lower row. Other suitable liquid/vapor contacting surfaces can be provided by Glitsch Grid, e.g., FLEXIGRID®-2, FLEXIGRID®-3, FLEXIGRID®-4, and FLEXIGRID®-5, available from Koch-Glitsch, Inc., Wichita, Kans., USA, and other distillation tower wide open packing.

In another embodiment of the present invention, at least a portion of the gas-liquid contact surface is provided by at least one distillation tray comprising (a) a bottom which comprises at least one passage for admitting vapor upward to the tray and (b) a weir over which liquid can spill, extending from and above the bottom. The distillation tray can be associated with a downcomer extending beneath the tray for directing liquid spilled over the weir, the downcomer typically being a downward extension of the weir. The downcomer can extend to a level at or below the liquid level in the lower portion of the boot.

The bottom of the distillation tray comprises a means for permitting the passage of vapor from the bottom of the boot to pass into the tray, e.g., by using perforations, bubble caps, valve tray openings, and/or jet tray openings.

In another embodiment, the middle portion of the boot can comprise an upper distillation tray and a lower distillation tray wherein a downcomer associated with the upper distillation tray extends below the upper distillation tray, and a downcomer associated with the lower distillation tray extends below the lower distillation tray. Typically, the downcomer associated with the lower distillation tray extends to or below the liquid level in the lower portion of the boot. In embodiments comprising multiple distillation trays, the downcomers are preferably staged or offset from each other so that the liquid they carry will pass to the tray portion rather than the downcomer portion of the distillation tray below. It is contemplated that more than two distillation trays can be used, e.g., three, four, five, or even more distillation trays, preferably about four.

In yet another embodiment, the middle portion of the boot comprises a side inlet for introducing a feedstream to the distillation stage. The side inlet can be located at a level above the weir of the distillation tray. Alternately, the side inlet for introducing a feedstream to the distillation tray is located at a level along the vertical length of the weir that can allow mixing of the tray contents with the feedstream. The feedstream introduced through the side inlet can be any suitable feedstream, e.g., recycled bottoms. Preferably the feedstream is a quenched feedstream derived from externally cooled recycled bottoms. In still another embodiment of the present invention, the apparatus further comprises at least one baffle located at a lower part of the middle section of the vertical drum providing a surface slanting downwardly from the center of the drum toward the circular wall and providing a gap between the baffle and the circular wall for directing liquid drops along or near the circular wall to the lower cap section. This baffle, which can be substantially conical in shape, partially isolates the bottom of the flash drum and boot from the upper part of the flash drum, but prevents hot swirling vapors from causing liquid to swirl and prevents the colder liquid in the boot from condensing the hotter vapor. Moreover, the baffle can prevent trace bottoms from entraining in the stripping gas which travels to the top of the flash vessel. The baffle advantageously is shaped, e.g., by having sufficient pitch where conical, to prevent pooling of liquid thereon. The baffle is typically perforated, comprising perforations which improve mass transfer during decoking, e.g., by permitting passage of air and steam through the baffle. In one embodiment the number and size of the perforations are selected to minimize hot vapor diffusion into the bottom of the drum during normal operation. Yet, during decoking, the perforations increase the fraction of the steam/air mixtures flowing out the bottom of the boot to effectively contact the entire drum. Without perforations, a thick layer of coke can build on the lower part of the drum and on the baffle. Thus, the perforations are advantageously sufficient in size to prevent coke from plugging them. In one embodiment, the baffle is perforated with at least one of substantially circular perforations and/or substantially rectangular perforations. The baffle can be perforated with perforations ranging in size from about 50 to about 200 $cm^2$ (8 to 31 $in^2$); for example, the perforations can have dimensions such as about 5 cm×20 cm (2 in×8 in) rectangles and/or about 10 to 15 cm (4 to 6 in) diameter circles. Advantageously, the baffle is perforated to an extent ranging from about 1% to about 20% of its surface area as compared to a corresponding unperforated baffle, for example to an extent sufficient to increase mass transfer from the apparatus of a steam/air mixture used for decoking. Although a single baffle is typically used in the lower part of the middle section of the drum, multiple baffles may be used as well.

As earlier noted, one embodiment of the apparatus of the present invention comprises a substantially concentrically positioned, substantially cylindrical boot of less diameter than the middle section, the boot communicating with the lower cap section, and further comprising an inlet for quench oil and a liquid outlet at its lower end. The boot is the location at which hot liquid can be quenched by recycle of externally cooled liquid. The boot is advantageously sized to provide negligible liquid residence time during quenching, which prevents coke formation and provides a sufficient liquid level to be controllable. The liquid level also provides net positive suction pressure (generally referred to as NPSH) to prevent cavitation in the pumps which serve to transfer liquid bottoms from the drum. The boot may comprise additional internal components to ensure that recycle quench is thoroughly and rapidly mixed with the hot liquid without causing vortexing of the liquid. Liquid vortices make the liquid level difficult to control and can allow gas to flow with the liquid into the pumps.

In one embodiment, the present invention relates to an apparatus wherein the boot further comprises an inlet for recycle quench oil.

In applying this invention, hydrocarbon feedstock containing resid may be heated by indirect contact with flue gas in a first convection section tube bank of the pyrolysis furnace before mixing with the fluid. Preferably, the temperature of the hydrocarbon feedstock is from about 150 to about 260° C. (300 to 500° F.) before mixing with the fluid and/or steam. The resulting mixture of feedstock and fluid may be further preheated before entering the flash drum.

Unless otherwise stated, all percentages, parts, ratios, etc. are by weight. Unless otherwise stated, a reference to a compound or component includes the compound or component by itself, as well as in combination with other compounds or components, such as mixtures of compounds.

Further, when an amount, concentration, or other value or parameter is given as a list of upper preferable values and lower preferable values, this is to be understood as specifically disclosing all ranges formed from any pair of an upper preferred value and a lower preferred value, regardless whether ranges are separately disclosed.

As used herein, non-volatile components, or resides, are the fraction of the hydrocarbon feed with a nominal boiling point above 590° C. (1100° F.) as measured by ASTM D-6352-98 or D-2887. This invention works very well with non-volatiles having a nominal boiling point above 760° C. (1400° F.). The boiling point distribution of the hydrocarbon feed is measured by Gas Chromatograph Distillation (GCD) by ASTM D-6352-98 or D-2887. Non-volatiles include coke precursors, which are large, condensable molecules that condense in the vapor and then form coke under the operating conditions encountered in the present process of the invention.

The hydrocarbon feedstock can comprise a large portion, such as about 0.3 to about 50%, of non-volatile components. Such feedstock could comprise, by way of non-limiting examples, one or more of steam cracked gas oil and residues, gas oils, heating oil, jet fuel, diesel, kerosene, gasoline, coker naphtha, steam cracked naphtha, catalytically cracked naphtha, hydrocrackate, reformate, raffinate reformate, Fischer-Tropsch liquids, Fischer-Tropsch gases, natural gasoline, distillate, virgin naphtha, atmospheric pipestill bottoms, vacuum pipestill streams including bottoms, wide boiling range naphtha to gas oil condensates, heavy non-virgin hydrocarbon streams from refineries, vacuum gas oils, heavy gas oil, naphtha contaminated with crude, atmospheric residue, heavy residue, C4's/residue admixture, naphtha/residue admixture, hydrocarbon gases/residue admixtures, hydrogen/residue admixtures, gas oil/residue admixture, and crude oil.

The hydrocarbon feedstock can have a nominal end boiling point of at least about 315° C. (600° F.), generally greater than about 510° C. (950° F.), typically greater than about 590° C. (1100° F.), for example greater than about 760° C. (1400° F.). The economically preferred feedstocks are generally low sulfur waxy residues, atmospheric residues, naphthas contaminated with crude, various residue admixtures, and crude oils.

Figure 1:
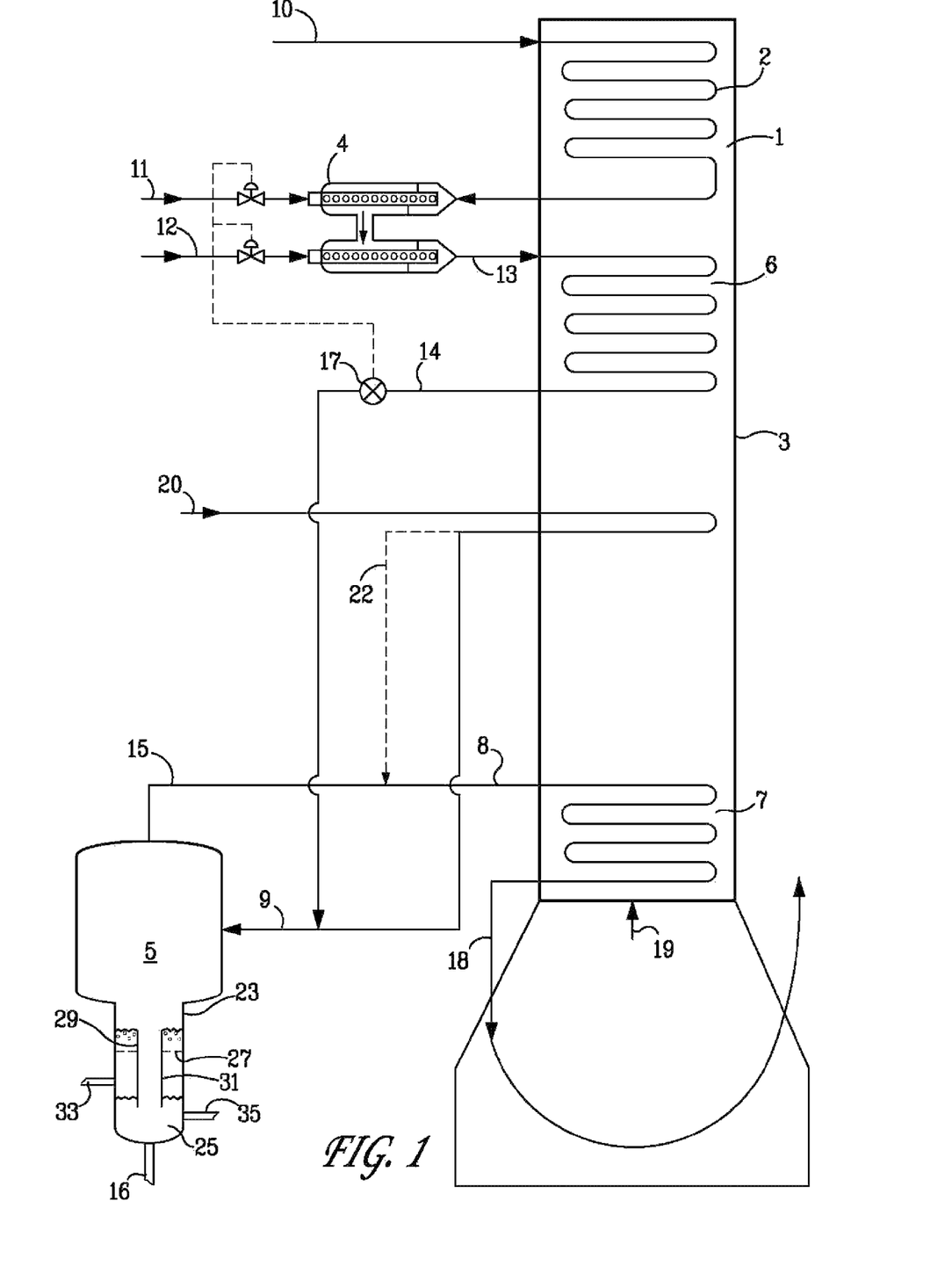
FIG. 1 illustrates a schematic flow diagram of a process in accordance with the present invention employed with a pyrolysis furnace, depicting a vapor/liquid separation apparatus comprising tangential inlets, perforated conical baffle, and boot with a single distillation tray and an inlet for quenched feed to the distillation tray.

A process for cracking a hydrocarbon feedstock 10 of the present invention as illustrated in FIG. 1 comprises preheating a hydrocarbon feedstock by a bank of exchanger tubes 2, with or without the presence of water 11 and steam 12 in the upper convection section 1 of a steam cracking furnace 3 to vaporize a portion of the feedstock and to form a mist stream 13 comprising liquid droplets comprising non-volatile hydrocarbons in volatile hydrocarbon/steam vapor. The further preheating of the feedstock/water/steam mixture can be carried out through a bank of heat exchange tubes 6. The mist stream upon leaving the convection section 14 has a first flow velocity and a first flow direction. The process also comprises treating the mist stream to coalesce the liquid droplets, separating at least a portion of the liquid droplets from the hydrocarbon vapor in a flash/separation vessel 5 to form a vapor phase 15 and a liquid phase 16, and feeding the vapor phase 8 to the lower convection section 7 and thence by crossover piping 18 to the radiant section of the cracking furnace 3. Flue gas from the radiant section is introduced to the lower convection section 7 of furnace 3 via 19.

As noted, the heavy hydrocarbon feedstock is preheated in the upper convection section of the furnace 1. The feedstock may optionally be mixed with steam before preheating or after preheating (e.g., preferably after preheater 2 in a sparger 4). The preheating of the heavy hydrocarbon can take any form known by those of ordinary skill in the art. It is preferred that the heating comprises indirect contact of the feedstock in the convection section of the furnace with hot flue gases from the radiant section of the furnace. This can be accomplished, by way of non-limiting example, by passing the feedstock through a bank of heat exchange tubes 2 located within the upper convection section 1 of the pyrolysis furnace 3. The preheated feedstock 14 before the control system 17 has a temperature between about 310 and about 510° C. (600 to 950° F.). Preferably, the temperature of the heated feedstock is between about 370 and about 490° C. (700 to 920° F.), more preferably between about 400 and about 480° C. (750 to 900° F.), and most preferably between about 430 and about 475° C. (810 to 890° F.).

As a result of preheating, a portion of the feedstock is vaporized and a mist stream is formed containing liquid droplets comprising non-volatile hydrocarbon in volatile hydrocarbon vapor, with or without steam. At flow velocities of greater than about 30 meters/second (100 feet/second), the liquid is present as fine droplets comprising non-volatile hydrocarbons entrained in the vapor phase. This two-phase mist flow is extremely difficult to separate into liquid and vapor. It is preferable to coalesce the fine mist into large droplets or a single continuous liquid phase before entering the flash drum. However, flow velocities of about 30 m/sec (100 ft/sec) or greater are normally necessary to practically effect the transfer of heat from the hot flue gases and reduce coking, especially in lower convection section 7 and/or further downstream.

Secondary dilution steam 20 can be convection heated in the furnace 3 and then directed to the flash drum 5 via line 9. In one embodiment, the heated secondary dilution steam can be added directly to the flash drum 5 via line 9. Alternately, the heated secondary dilution steam can be added to the flash drum overhead by an optional bypass 22.

Flashing is normally carried out in at least one flash drum. In the flash drum 5, the vapor phase stream is removed from at least one upper flash drum outlet 15 and the liquid phase passes through the boot 23 and collects at a set level as stripped liquid bottoms 25 at the bottom of the boot. Distillation tray 27 has a perforated bottom, a weir 29 extending above said tray, and a downcomer 31 (an extension of the weir) extending below said tray to the liquid in the bottom of the boot. The downcomer is of sufficient cross-section to ensure that the liquid bottoms flowing into it does not plug it. The weir 29 is of sufficient height to allow good contact between the stripping gas and the liquid bottoms, but short enough to minimize residence times in the distillation tray to an extent sufficient to avoid unwanted coking reactions. The boot further comprises an inlet for stripping gas 33 passing through the side wall of the boot at a level between the liquid level and below the distillation tray. An optional inlet for cooled liquid 35 is provided which preferably introduces cooled liquid into the stripped liquid bottoms 25, quenching them. Bottoms are removed from the boot through lower flash drum outlet 16.

Assuming one theoretical distillation stage is provided within the boot, 500 kg/hr of hydrogen or an equimolar amount of steam or other stripping gas (about 1% on convection feed) can typically increase the overall vapor provided by the atmospheric resid feed to the process, from about 66% to about 74%. The amount of liquid bottoms from the boot recovered as cracking feed is (74−66)/(100−66)×100%, or about 25%. Stripping the bottoms in accordance with the present invention is preferred to simply adding 500 kg/hr of hydrogen to the convection section feed or dilution steam, which would only increase the overall atmospheric resid feed to the process from about 66% to about 70%. Tower simulations also show that 4000 kg/hr of steam stripping using one distillation tray with a 70% stage efficiency can vaporize 25% of the liquid tower bottoms or 8% of the atmospheric resid feed when using the present invention.

Figure 2:
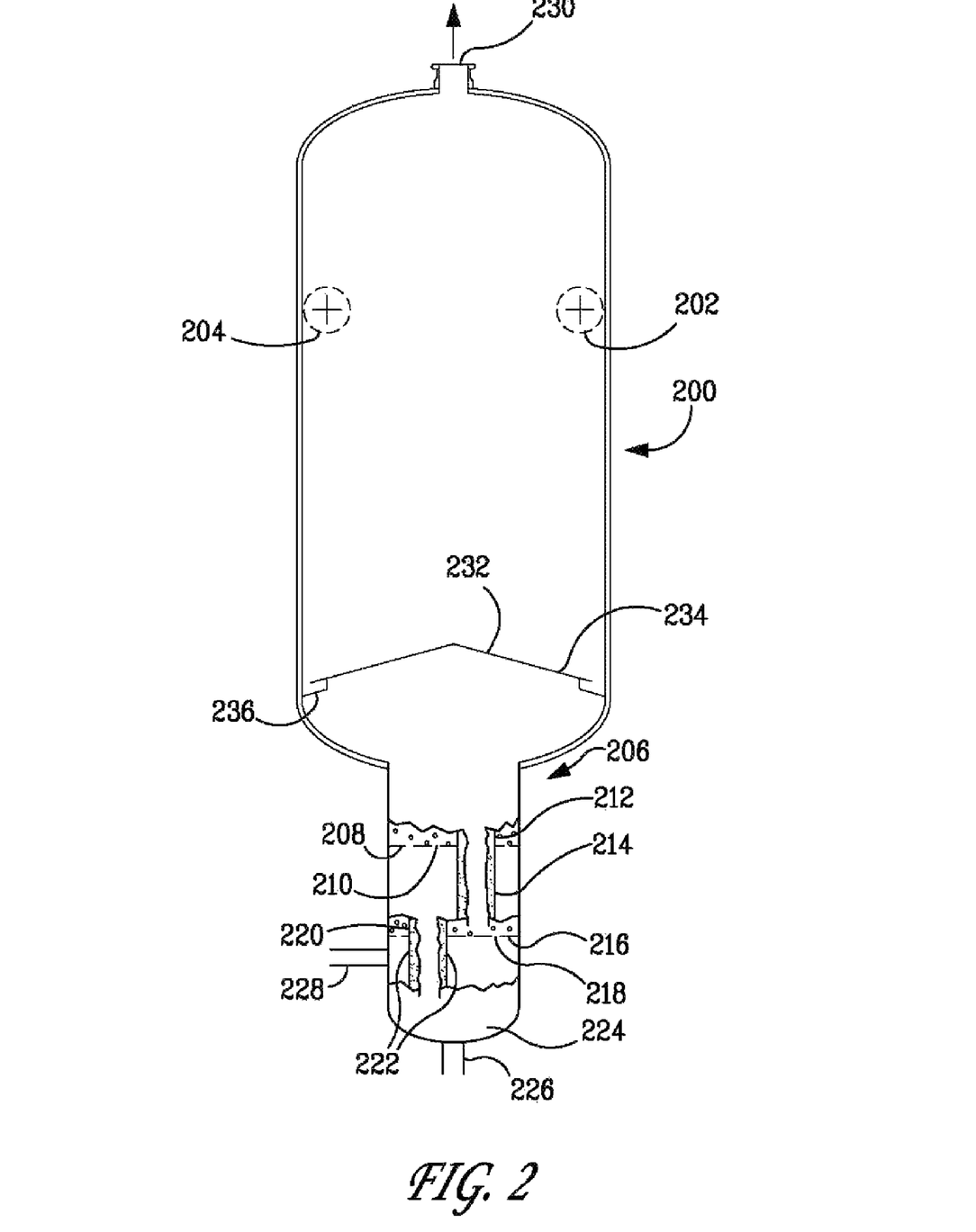
FIG. 2 illustrates an elevational view of an embodiment of the flash/separation apparatus of the present invention comprising tangential inlets, a perforated conical baffle, and a boot which has an inlet for stripper gas, an upper distillation tray, and a lower distillation tray.

One sieve tray may not provide a sufficient number of theoretical distillation stages of separation. FIG. 2 depicts an embodiment of the invention where multiple sieve trays (two, in this illustration) are installed in the boot. FIG. 2 also depicts an optional conical baffle in the main flash drum. In FIG. 2 the stream to be flashed enters the flash drum 200 tangentially through tangential flash drum inlet 202 and 204. Preferably, the tangential inlets are level or of slightly downward flow. The non-volatile hydrocarbon liquid phase will form an outer annular flow along the inside flash drum wall and the volatile vapor phase will initially form an inner core and then flow upwardly in the flash drum. The liquid phase passes down the side walls into the boot 206. The boot comprises an upper distillation tray 208 comprising perforations 210 in its bottom, which collects liquid passing down the side walls of the drum and boot. The upper distillation tray comprises an upper weir 212 with upper downcomer 214 extending below the tray and preferably extending into the liquid of the distillation tray below. When the level of liquid in the upper distillation tray reaches the edge of the upper weir, the liquid cascades down through the upper downcomer onto the lower distillation tray 216. The lower distillation tray comprises perforations 218, a lower weir 220 and a lower downcomer 222 which extends below the lower distillation tray, preferably extending to or into the stripped liquid 224 collecting in the bottom of the boot which can be withdrawn from the boot via lower boot outlet 226. When the level of liquid in the lower distillation tray reaches the edge of the lower weir, the liquid cascades down through the lower downcomer into the stripped liquid collecting in the boot. Stripping gas is introduced to the boot through stripping gas inlet 228. Stripped vapor including stripping gas passes upwardly through the perforations in the lower distillation tray and bubbles through the liquid collected in the lower distillation tray. Thence the vapor passes through the perforations in the upper distillation tray and through the liquid collected in the upper distillation tray. The vapor which escapes from the liquid in the upper distillation tray passes upwardly from the boot into the flash drum and passes from the flash drum through overhead vapor outlet 230. A conical baffle 232 comprising perforations 234 captures any stripped liquid bottoms that entrains when the rising bubbles of stripping agent burst at the liquid level at the upper distillation tray. Without the conical baffle, the upward momentum of the entrained liquid could propel it to the top of the drum. The conical baffle can be supported by columns or brackets 236 attached to the drum wall. The upward velocity of the stripping agent may be one or more m/sec (a few ft/sec) in the freeboard above the boot. Preferably the baffle comprises perforations in its outer regions and is solid, i.e., lacking perforations, in its center section area, for example, an area generally corresponding to the diameter of the boot. The presence of the perforations provides for good mass transfer during steam/air decoking.

Figure 3:
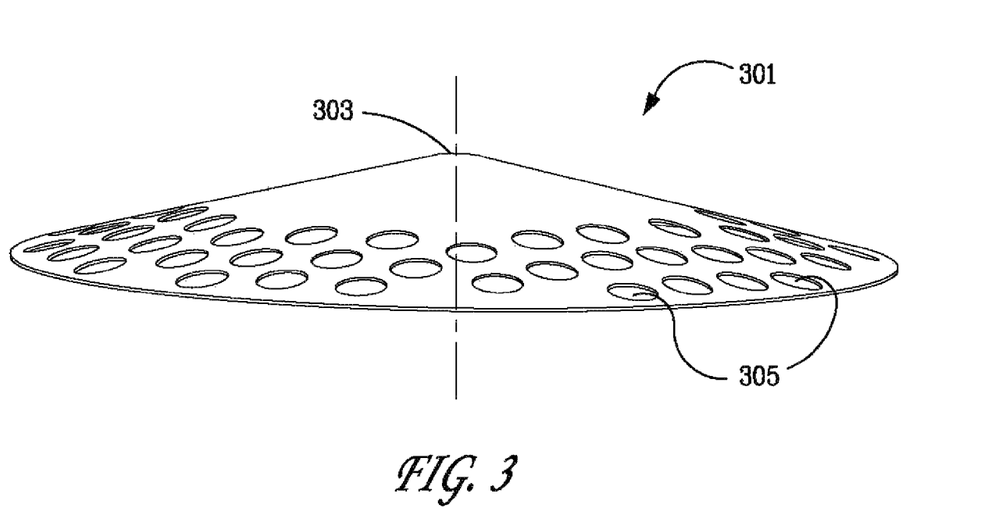
FIG. 3 provides a detailed perspective view of a perforated conical baffle used in an embodiment of the present invention.

Referring to FIG. 3, a perspective view is provided of a perforated conical baffle 301 having an apex 303 used in an embodiment of the present invention, which includes perforations 305 of round, elliptical, or rectangular shape along its outer portions.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A vapor/liquid separation apparatus comprising:
   (a) a vertical drum having an upper cap section, a middle section comprising a circular wall, and a lower cap section;
   (b) an overhead vapor outlet attached to said upper cap section;
   (c) at least one tangential inlet for a feedstream in the circular wall of said middle section providing an annular flow along the inside of the wall; and
   (d) a boot of less diameter than said middle section, said boot comprising:
      (1) an upper portion communicating with said lower cap section,
      (2) a middle portion comprising a gas-liquid contact surface provided by at least one member of the group consisting of a shed and a baffle,
      (3) a lower portion for receiving liquid and holding it at a liquid level, which further comprises a lower outlet for removing said liquid and an inlet for introducing a stripping gas into said boot below said gas-liquid contact surface;

the apparatus further comprising: at least one perforated baffle lacking perforations in its center section area, located at a lower part of said middle section providing a surface slanting downwardly from the center of said drum toward the circular wall and providing a gap between said baffle and said circular wall for directing liquid drops along or near the circular wall to said lower cap section.

2. The apparatus of claim 1 wherein said baffle is perforated in its outer section and lacks perforations in its center section area generally corresponding to the diameter of the boot.

3. The apparatus of claim 1 wherein said baffle is substantially conical.

4. A vapor/liquid separation apparatus for treating a resid-containing hydrocarbon feedstock to a thermal cracker comprising:
   (a) a vertical drum having an upper cap section, a middle section comprising a circular wall, and a lower cap section;
   (b) an overhead vapor outlet attached to said upper cap section and connected to a pyrolysis furnace comprising a convection section and a radiant section;
   (c) at least one tangential inlet for the resid-containing hydrocarbon feedstock in the circular wall of said middle section providing an annular flow along the inside of the wall; and
   (d) a boot of less diameter than said middle section, said boot comprising:
      (1) an upper portion communicating with said lower cap section,
      (2) a middle portion comprising a gas-liquid contact surface provided by at least one member of the group consisting of a shed and a baffle,
      (3) a lower portion for receiving liquid and holding it at a liquid level, which further comprises a lower outlet for removing said liquid and an inlet for introducing a stripping gas into said boot below said gas-liquid contact surface;

the apparatus further comprising: at least one perforated baffle lacking perforations in its center section area, located at a lower part of said middle section providing a surface slanting downwardly from the center of said drum toward the circular wall and providing a gap between said baffle and said circular wall for directing liquid drops along or near the circular wall to said lower cap section.

5. The apparatus of claim 4 wherein said gas-liquid contact surface is sufficient to provide at least 10% of a theoretical distillation stage.

6. The apparatus of claim 4 wherein said gas-liquid contact surface is sufficient to provide at least 20% of a theoretical distillation stage.

7. The apparatus of claim 4 wherein at least a portion of said gas-liquid contact surface is provided by at least one shed.

8. The apparatus of claim 4 wherein at least a portion of said gas-liquid contact surface is provided by at least one baffle.

9. The apparatus of claim 4 wherein said baffle is perforated in its outer section and lacks perforations in its center section area generally corresponding to the diameter of the boot.

10. The apparatus of claim 4 wherein said baffle is substantially conical.

11. The apparatus of claim 4 wherein said vertical drum is substantially cylindrical.

12. The apparatus of claim 4 wherein said boot is substantially cylindrical.

13. The apparatus of claim 4 wherein said boot is positioned substantially concentrically with respect to said vertical drum.

* * * * *